Jan. 1, 1946.　　　R. W. PALMER ET AL　　　2,391,998
RETRACTABLE LANDING GEAR FOR AIRPLANES
Filed May 27, 1942　　　4 Sheets-Sheet 3
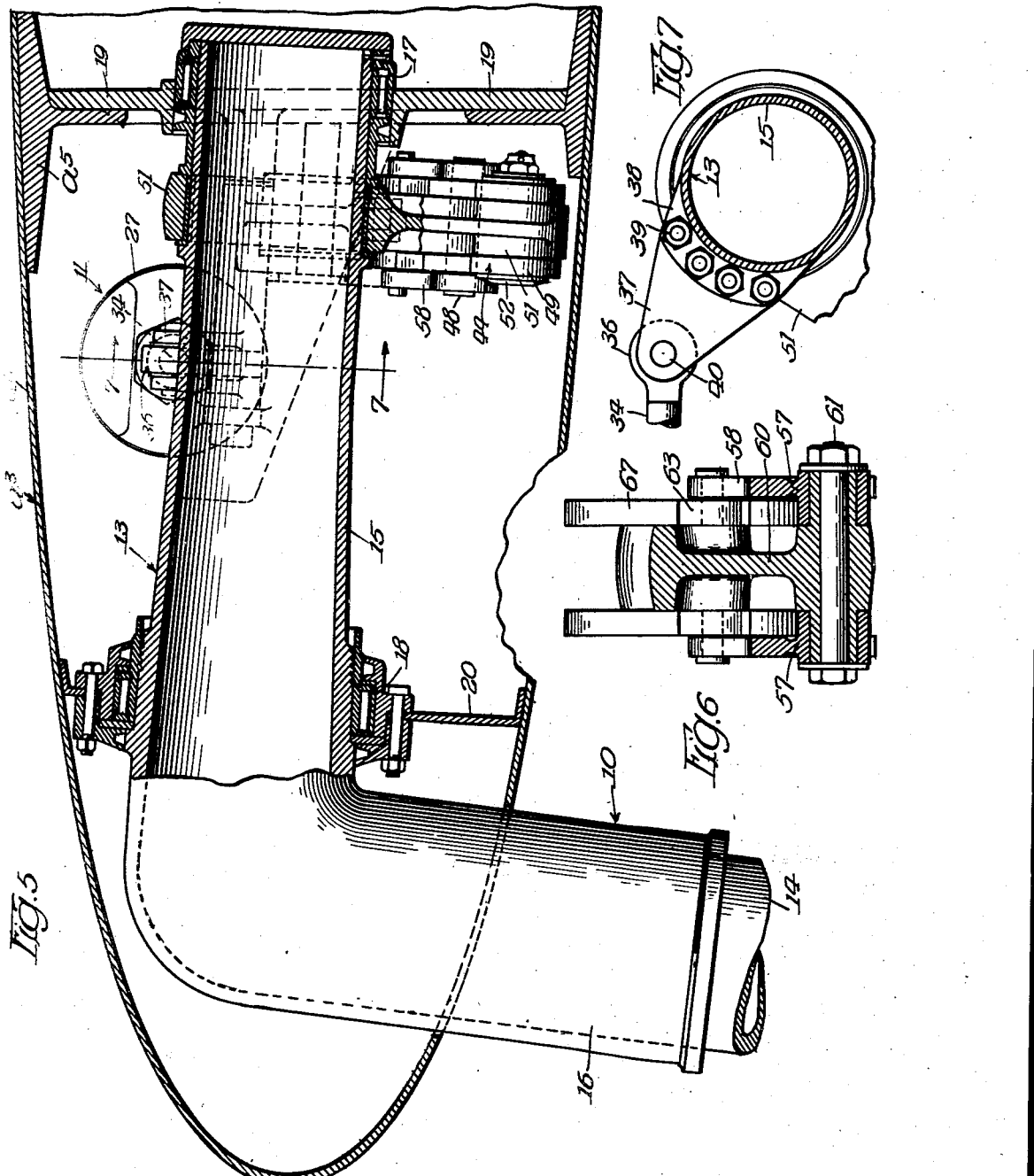
Inventors
Richard W. Palmer
John M. Hudson
By Thed Gerlach Atty.

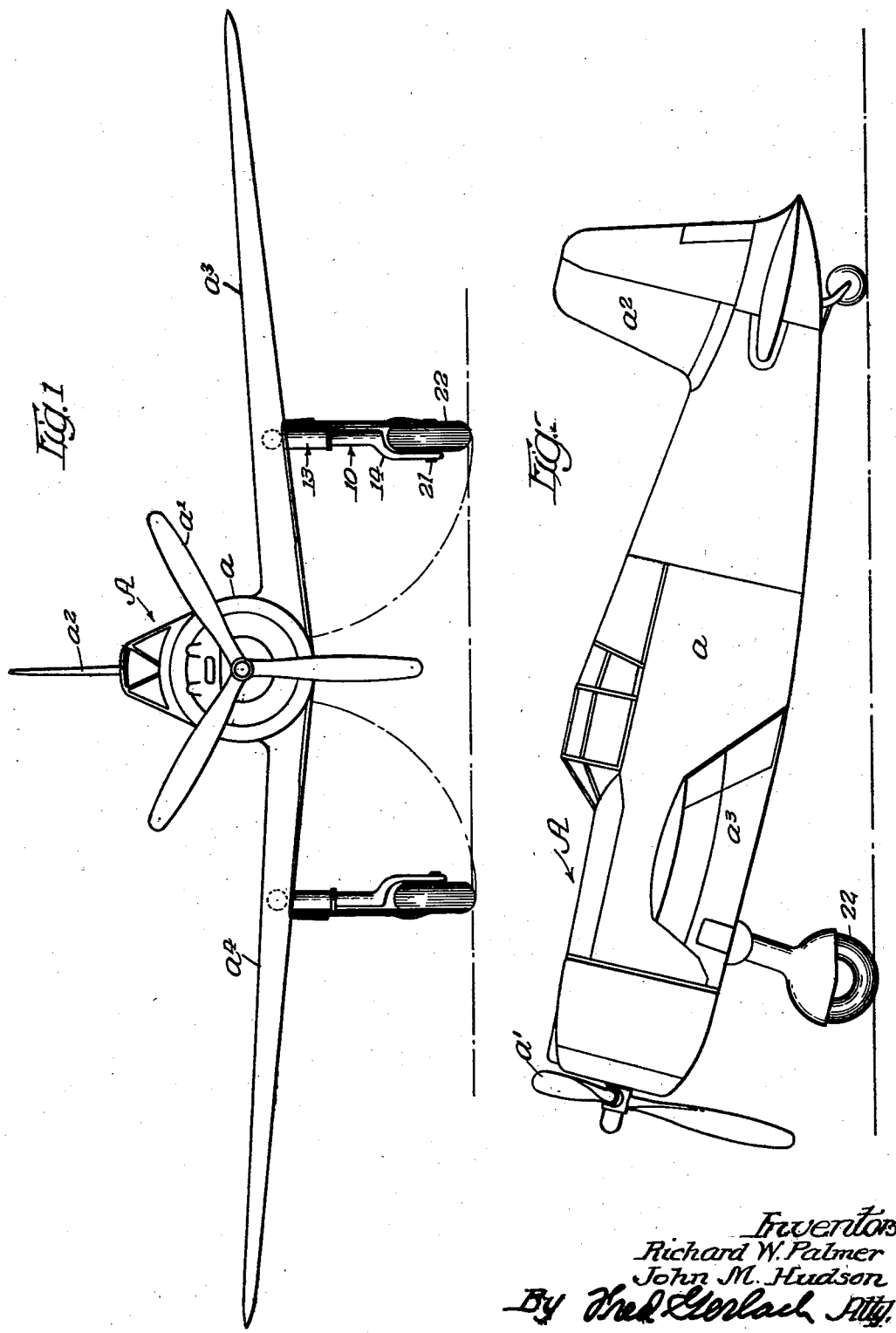

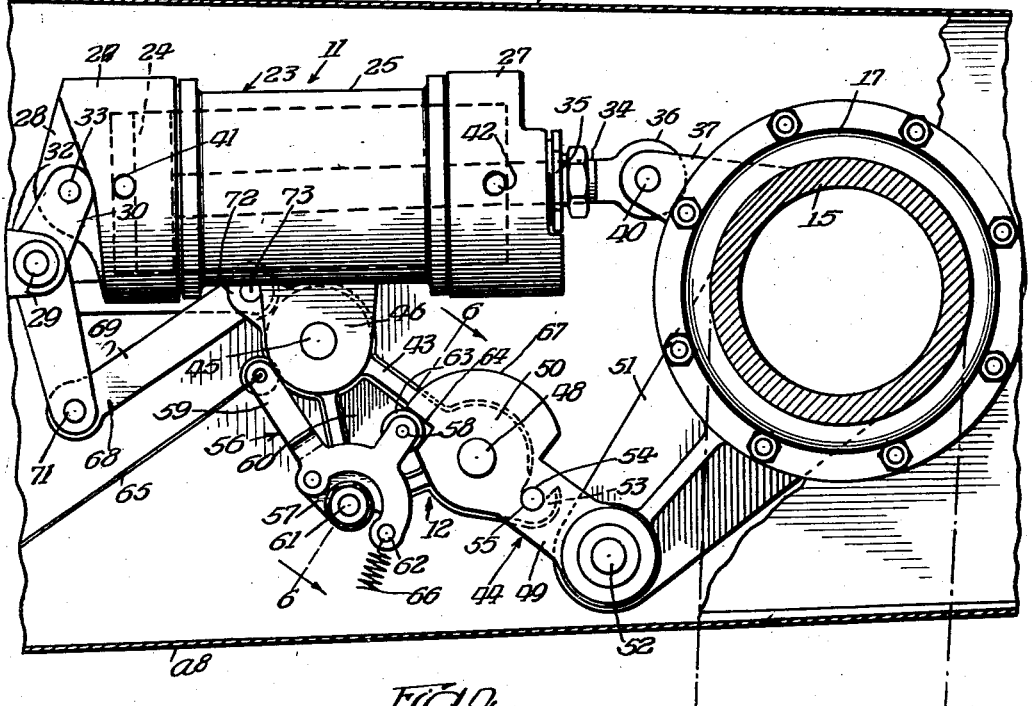
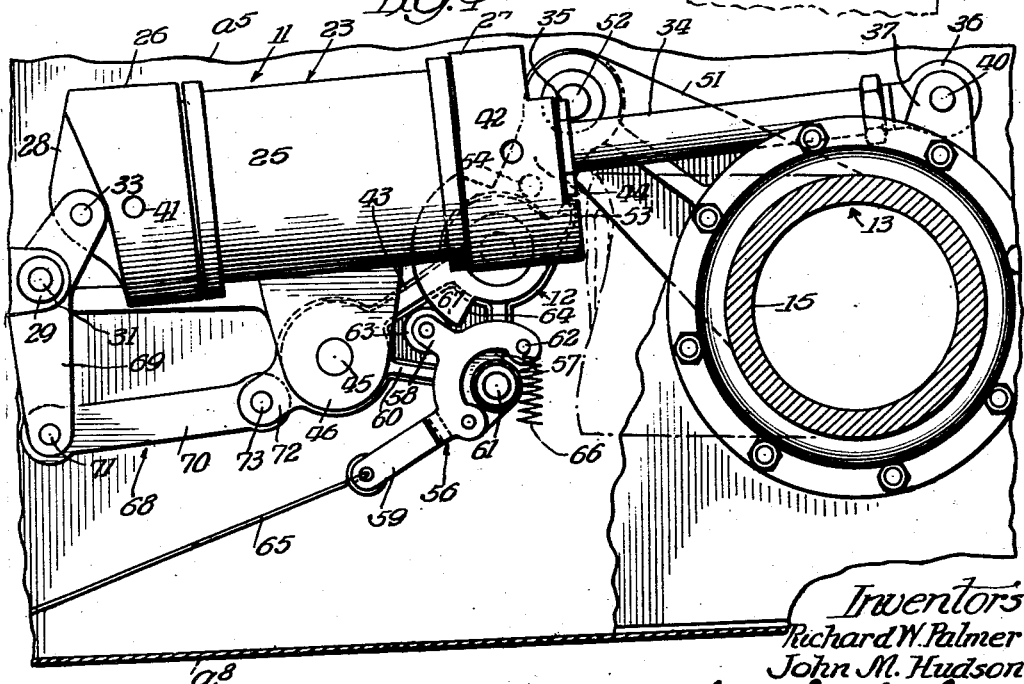

Jan. 1, 1946.   R. W. PALMER ET AL   2,391,998
RETRACTABLE LANDING GEAR FOR AIRPLANES
Filed May 27, 1942   4 Sheets-Sheet 4
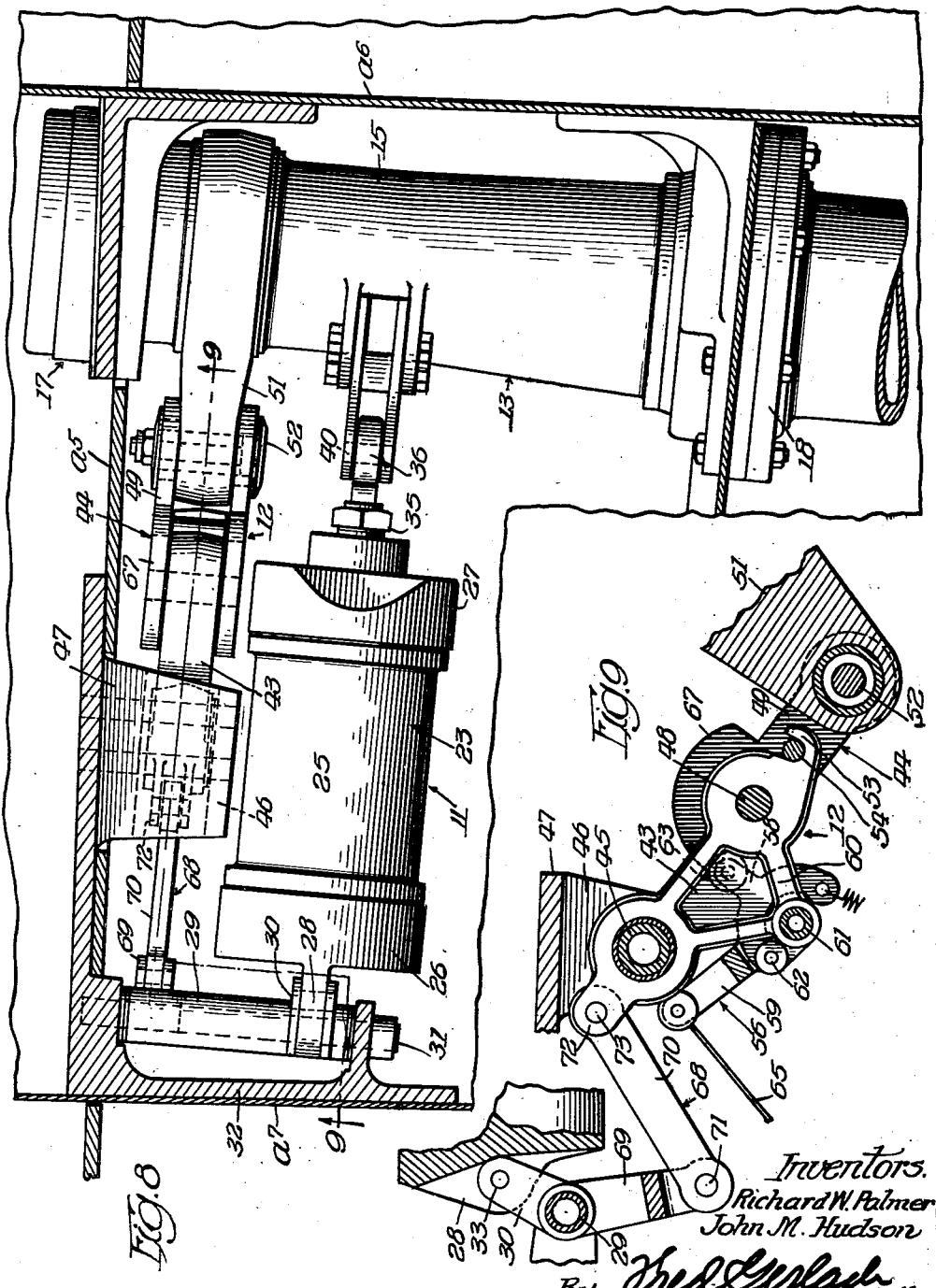
Inventors.
Richard W. Palmer
John M. Hudson
By Fred L. Gerlach
Atty Patented Jan. 1, 1946

2,391,998

UNITED STATES PATENT OFFICE 2,391,998

RETRACTABLE LANDING GEAR FOR AIRPLANES

Richard W. Palmer, Whittier, and John M. Hudson, Downey, Calif., assignors, by mesne assignments, to Consolidated Vultee Aircraft Corporation, a corporation of Delaware Application May 27, 1942, Serial No. 444,652

6 Claims. (Cl. 244—102)

The present invention relates generally to retractable landing gear for airplanes. More particularly the invention relates to that type of retractable landing gear which is designed primarily for use in connection with an airplane of the low wing, monoplane variety and comprises a strut which has one end thereof pivotally mounted in the wing of the airplane and its other end provided with a ground wheel and is shiftable back and forth between an operative position wherein it extends downwards from the wing, and a retracted or inoperative position wherein it extends in substantially parallel relation with the wing and fits within a pocket in the other side of the wing and the wheel is disposed in a well in the wing and at one end of the strut receiving pocket.

One object of the invention is to provide a retractable landing gear of this type which is an improvement upon, and has certain advantages over, previously designed landing gear.

Another object of the invention is to provide a landing gear of the type under consideration which includes a simple and novel linkage for locking the strut in its operative or extended position.

Another object of the invention is to provide a retractable landing gear of the last mentioned character in which the wheel carrying strut is shiftable back and forth between its operative and retracted positions by way of a hydraulic device in the form of a cylinder and piston and the linkage for locking the strut in its operative position comprises a pair of links which have certain ends thereof pivotally connected to one another, are arranged so that they are disposed in dead-center or self locking relation when the strut is in its extended or operative position and are adapted to "break" or move out of dead-center relation in one direction in connection with shift of the strut into its retracted position.

A further object of the invention is to provide a retractable landing gear of the type and character last mentioned which includes a latch for locking the links in their dead-center or self locking position and also includes an interconnection between the hydraulic device and the locking linkage for automatically "breaking" the links upon release of the latch and initial actuation of the hydraulic device in connection with shift of the strut into its retracted position.

A still further object of the invention is to provide an airplane retractable landing gear which is comparatively simple in design and construction and is characterized by the fact that it efficiently and effectively fulfills its intended purpose and the strut thereof is positively locked in place when it is in its operative or extended position.

Other objects of the invention and the various advantages and characteristics of the present retractable landing gear will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a front view of an airplane of the low wing, monoplane variety having applied thereto a retractable landing gear embodying the invention;

Figure 2 is a side view of the airplane;

Figure 3 is a longitudinal section through that part of the wing of the airplane in which the upper end of the wheel carrying strut is pivoted, illustrating the design and arrangement of the hydraulic device for shifting the strut back and forth between its operative and retracted positions and also the construction and design of the locking linkage, the latch for locking the links of the linkage in their dead-center position and the interconnection between the device and the linkage and showing the gear in its operative or extended position;

Figure 4 is a similar section illustrating the gear in its retracted position;

Figure 5 is a transverse section of the gear equipped portion of the wing, showing in detail the manner in which the elbow constituting the upper end of the wheel carrying strut is journalled in the wing;

Figure 6 is an enlarged section taken on the line 6—6 of Figure 3 and illustrating in detail the construction of the latch for locking the links of the linkage in their dead-center relation and showing the manner in which the latch is mounted;

Figure 7 is a section taken on the line 7—7 of Figure 5 and illustrating the manner in which the hydraulic device is connected to the elbow;

Figure 8 is a plan view of the elbow at the upper end of the strut, the hydraulic device for shifting the strut back and forth between its operative and retracted positions, and the locking linkage; and Figure 9 is a section on the line 9—9 of Figure 8.

The retractable landing gear which is shown in the drawings constitutes the preferred form or embodiment of the invention. It is shown in connection with an airplane A of the low wing monoplane variety and comprises as its main component parts a strut 10, a hydraulic device 11 and a locking linkage 12. The airplane A is of conventional design and comprises a fuselage $a$ having a motor driven propeller $a^1$ at its front end and an empennage $a^2$ at its rear end. In addition the airplane comprises a wing which is secured to, and extends outwardly from, the lower central portion of the fuselage and consists of a left-hand section $a^3$ and a right-hand section $a^4$. The improved landing gear is shown in connection with the left-hand section $a^3$ of the wing and coacts with a similar but reversely positioned gear on the right-hand section $a^4$ of the wing to support the airplane A when it is on the ground. The left-hand section of the wing comprises a longitudinally extending front spar $a^5$, a pair of laterally spaced cross ribs $a^6$ and $a^7$, and a surrounding skin $a^8$. The cross rib $a^6$, as shown in Figure 8, is disposed outwardly of, and extends substantially parallel to, the rib $a^7$.

The strut 10 comprises a tubular elbow 13 and a shock or cushion type leg 14. The elbow is preferably in the form of a one-piece aluminum casting and consists of an arm 15 and an arm 16. The arm 15 is disposed in the nose portion of the wing section $a^3$ and is located directly inwards of the cross rib $a^6$. It extends transversely of the left-hand section $a^3$ of the wing and is journalled for rotation about its longitudinal axis by a rear bearing 17 and a front bearing 18. The rear end of the arm 15 of the elbow extends through an aperture in the front spar $a^5$ and is surrounded by the rear bearing 17. The latter, as shown in Figure 8, is carried by a bracket type plate 19 on the apertured portion of the front spar. The front bearing 18 surrounds the front portion of the elbow arm 15 and is carried by a suitable supporting structure 20 in the nose portion of the wing section $a^3$. The other arm of the elbow, i. e., the arm 16, is connected to the front end of the arm 15 and extends at substantially right angles thereto. One end of the leg 14 is mounted within the outer arm 16 of the elbow and the other end of the leg is provided with a stub axle 21 on which is mounted a ground wheel 22. The two bearings 17 and 18 in which the arm 15 of the elbow 13 is journalled constitute a pivotal connection whereby the strut is supported so that it is shiftable back and forth between an operative position wherein it extends downwards from the wing section $a^3$ and an inoperative or retracted position wherein it is disposed within, and in substantially parallel relation with, the wing section $a^3$. The ground wheel 22 is carried by the stub axle 21 so that it extends substantially parallel to the fuselage of the airplane A when the strut is in its operative or down position. Preferably the strut is arranged so that it swings inwards and upwards into its retracted position. The under portion of the wing section $a^3$ is provided with a pocket (not shown) for accommodating the elbow arm 16 and the strut leg 14 when the strut is in its retracted position. It is also provided with a well (not shown) at the inner end of the pocket for accommodating the wheel 22.

The hydraulic device 11 constitutes the medium or means for shifting the strut 10 back and forth between its operative and retracted positions. It is disposed in that part of the nose portion of the wing section $a^3$ which is between the cross ribs $a^6$ and $a^7$ and consists of a cylinder 23 and a piston 24. The cylinder is mounted in front of the front spar $a^5$ of the wing section $a^3$ in a floating manner as hereinafter described and extends longitudinally of the wing section $a^3$. It is disposed inwards of the arm 15 of the strut elbow 13 and consists of a tubular side wall 25 of circular cross section, and a pair of cap-like heads 26 and 27. The side wall extends normally substantially horizontally and is disposed above the longitudinal axis or center of the arm 15 of the elbow 13, as shown in Figures 3, 4 and 5. The head 26 is mounted on, and suitably secured to, the inner end of the side wall 25 of the cylinder and has a vertically extending external lug 28 on the cross wall thereof. The inner or inboard end of the cylinder is movable supported by way of a sleeve 29 and a pair of arms 30. The sleeve is rotatably mounted or journalled on a pin 31 and is parallel to the bearing supported arm 15 of the strut elbow 13. The pin 31 is carried by an angle bracket 32, one leg of which is suitably secured to the cross rib $a^7$ and the other leg of which fits against and is secured to the front spar $a^5$ of the wing section $a^3$. The ends of the pin 31 are mounted in apertured lugs on the bracket 32 and these lugs, as shown in Figure 8, straddle the sleeve 29 and prevent axial displacement of the latter. The arms 30 are disposed in spaced apart and parallel relation and are connected fixedly to, and project radially from, the front end of the sleeve 29. The outer ends of the arms 30 lap the lug 28 on the cross wall of the cylinder head 26 and are pivotally connected to the lug by way of a pivot pin 33. This pin extends transversely through the outer ends of the arms 30 and the central portion of the lug 28 and is parallel to the sleeve 29. Such sleeve together with the arms 30 and the pivot pin 33 supports the inner end of the cylinder 23 in such manner that the cylinder is free to swing upwards and downwards and also move longitudinally to and from the cross rib $a^7$ of the wing section $a^3$. The head 27 is secured to the other or outer end of the tubular side wall 25 of the cylinder 23. The piston 24 of the hydraulic device 11 is mounted in the tubular side wall 25 of the cylinder to slide back and forth between the heads 26 and 27 and is provided with an outwardly extending piston rod 34 which extends through, and is slidably mounted in, a stuffing box 35 on the cross wall of the cylinder head 27. The outer end of the piston rod is provided with an eye 36 and is operatively connected to the arm 15 of the elbow 13 by way of an arm 37. One end of this arm fits between a pair of laterally spaced radially extending lugs 38 on the upper part of the central portion of the elbow arm 15 and is fixedly secured in place by means of a series of bolts 39 (see Figure 7). The other or outer end of the arm 37 is bifurcated and straddles the eye 36 on the outer end of the piston rod 34. A pivot pin 40 extends through the outer end of the arm 37 and the aperture or hole in the eye 36 and serves pivotally to connect the eye to the outer end of the arm. When the piston 24 in the cylinder 23 is shifted in the direction of the cylinder head 27 the piston rod 34 and the arm 37 operate to rotate the elbow 13 in a clockwise direction as viewed in Figures 3 and 4 and thus cause the strut 10 to move or swing into its retracted position within the confines of the left-hand section $a^3$ of the wing. When the piston 24 is slid in the opposite direction, i. e., toward the cylinder head 26, the piston rod 34 and the arm 37 rotate the elbow 13 in a counterclockwise direction, as viewed in Figures 3 and 4 and thus cause swinging of the strut into its operative or extended position. Outward shift of the piston for strut retracting purposes is effected by introducing fluid under pressure into the inner end of the cylinder and venting the other or outer end of the cylinder, and inward shift of the piston for strut lowering or extending purposes is effected by introducing fluid under pressure into the outer end of the cylinder and venting the inner end of the cylinder. For venting and supplying fluid under pressure to the cylinder ends a pair of pipes 41 and 42 is provided. The pipe 41 leads from a pilot controlled valve (not shown) in the pilot's compartment of the airplane A to the inner end of the cylinder, and the pipe 42 leads from such valve to the outer end of the cylinder. It is contemplated that the valve be manipulated or controlled by a handle so that when it is turned to one position fluid under pressure, such as oil, will flow into the inner end of the cylinder via the pipe 41 and the pipe 42 will be vented, as well understood in the art. It is also contemplated that when the valve is shifted to another position fluid under pressure will flow into the outer end of the cylinder via the pipe 42 and the pipe 41 will be vented. When fluid under pressure is introduced into the inner end of the cylinder and the pipe 42 is vented the pressure developed within the space between the piston 24 and the cylinder head 26 results in the cylinder moving inwards to a limited extent and the piston moving outwards and causing retraction of the wheel carrying strut. When fluid under pressure is introduced into the outer end of the cylinder 23 and the pipe 41 is vented the pressure created between the piston 24 and the outer cylinder head 27 will cause outward shift of the cylinder to a limited extent and inward shift of the piston with resultant lowering of the strut.

The locking linkage 12 serves positively to lock the strut 10 in its operative or extended position. It is disposed between the front spar $a^5$ and the hydraulic device 11 and comprises a pair of links 43 and 44. The link 43 is preferably in the form of a one-piece casting and has one end thereof pivotally or rotatively mounted on a fixed pin 45. The latter is carried by a pair of laterally spaced depending ears 46 on a lug 47 and is arranged in parallel relation with the sleeve 29 and the bearing supported arm 15 of the elbow 13. The ears 46 are arranged in lapped relation with said one end of the link 43, and the lug 47 from which the ears depend is connected to the leg of the angle bracket 32 that fits against the front spar $a^5$ (see Figure 8). The other end of the link 43 is provided with a transversely extending pivot pin 48. The link 44 is in the form of a pair of similarly shaped plate-like members 49. Certain of the ends of these members are arranged in lapped relation with the end of the link 43 that carries the pivot pin 48. They have enlargements 50, as best shown in Figure 3, and are pivotally mounted on the ends of the pivot pin 48. The other ends of the plate-like members 49 that constitute the link 44 of the locking linkage 12 lap one end of an arm 51. This arm extends radially from, and is rigidly secured to, the rear end of the arm 15 of the elbow 13. A pivot pin 52 extends through the outer or distal end of the arm 51 and the adjacent ends of the link members 49 and serves pivotally to connect one end of the link 44 to the arm 51. The pivot pin 48 constitutes a pivotal connection between the other end of the link 44 and the link 43. The arm 51 is disposed at substantially right angles to the arm 37 which serves to connect the outer end of the piston rod 34 to the elbow arm 15. When the strut 10 is in its operative or extended position the two links 43 and 44 and the arm 51 are arranged in the form of a V and the two links are in dead-center or self locking relation. So long as the two links are in such relation the linkage 12 serves positively to lock the strut in its operative position. The links 43 and 44 when in dead-center relation are prevented from "breaking" upwards by way of a hook 53 and a pin 54. The hook is formed as an integral part of the link 43 and is disposed outwards of the pivot pin 48. It is adapted in connection with swinging of the two links into dead-center relation to move between the link members 49 into hooked relation with the pin 54. The latter extends between the central portions of the members 49 constituting the link 44 and has the ends thereof mounted snugly in apertures 55 in said members. The hook 53 and the pin 54 constitute means for positively preventing "breaking" of the links 43 and 44 in one direction when the links are in dead-center relation due to the wheel carrying strut being in its operative or extended position. A latch 56 serves to prevent downward or opposite "breaking" of the links when they are in their dead-center or self-locking position. This latch is in the form of a pair of plate-type bell cranks comprising hubs 57, short legs 58 and long legs 59. The hubs of the bell cranks are arranged in straddled relation with a downwardly extending laterally projecting extension 60 on the central portion of the link 43 and are pivotally connected to such extension by way of a bolt-type pivot pin 61. Cross pins 62 extend between the hubs 57 and serve rigidly to connect the two bell cranks so that the latch 56 is of unitary design. The short legs 58 of the two bell cranks extend at substantially right angles to the long legs 59 and carry rollers 63 at their outer ends. When the latch is in its operative or locking position the short legs 58 of the bell cranks extend at right angles to the two links 43 and 44 and the rollers 63 are disposed in notches 64 in the enlargements 50 of the plate-like members 49 constituting the link 44. As shown in Figures 3 and 4 the pivot bolt 61 is disposed between the pivot pins 45 and 48. The longs legs 59 of the bell cranks are bent inwards and secured together to form a handle or lever whereby the latch may be rotated in a counterclockwise manner, as viewed in Figure 3, in order to bring the rollers 63 out of seated relation with the notches 64 and thus release the links 43 and 44 for downward "breaking" in connection with upward swing of the strut into its retracted position. A flexible cable 65 leads from the outer ends of the long legs of the latch forming bell cranks to the handle or control lever of the valve for the hydraulic device 11 and is so arranged that when the handle or lever is initially turned to effect retraction of the strut it operates to rotate or swing the latch into its released position. When the latch is in such position the two links 43 and 44 of the locking linkage 12 are free to "break" downwards and thus release the wheel carrying strut for upward swing into its retracted position. A spring 66 is applied to one of the cross pins 62 and serves to urge the latch 56 into its operative or locking position. The enlargements 50 of the members 49 constituting the link 44 have arcuate or sector shaped portions 67 which coact with the rollers 63 positively to hold the latch 56 in its released position when the links are in "broken" relation in connection with shifting of the strut out of and into its operative or extended position. When the latch 56 is swung by the cable 65 into its released position wherein the rollers are out of seated relation with the notches 64 and the links 43 and 44 are "broken" downwards the arcuate portions 67 of the enlargements 50 swing into engagement with the rollers and thus hold the latch in its released position. In connection with retraction of the strut the arm 51 swings upwards as shown in Figure 4 and causes the link 44 to swing relatively to the link 43. When the strut is swung downwards into its operative or extended position the arm 51 swings downwards until the two links 43 and 44 are in dead-center relation. As soon as the links are in such relation the spring 66 operates to rotate or turn the latch 56 into its operative position wherein the rollers 63 seat within the notches 64. As soon as the rollers are in the notches the links cannot be shifted out of their dead-center or self locking position and the strut is positively locked in its down or operative position. The latch must be released before the strut can be swung upwards into its retracted position and automatically snaps into its locking position at the end of the downward swinging movement of the strut.

In order automatically to "break" downwards the links 43 and 44 after release of the latch 56 in connection with swinging of the strut 10 into its retracted position a second linkage 68 is provided. This linkage is in the form of an interconnection between the hydraulic device 11 and the locking linkage 12 and consists of an arm 69 and a link 70. The arm is rigidly connected to, and projects radially in a downwards direction from, the sleeve 29, i. e., the part or element to which the inner end of the cylinder 23 is connected by way of the arms 30. The outer or distal end of the arm 69 is bifurcated. It straddles one end of the link 70 and is pivotally connected thereto by way of a pivot pin 71. The other end of the link 70 is pivotally connected to a lug-type extension 72 on the inner end of the link 43 by way of a pivot pin 73. The pivot pin 45 for pivotally supporting the inner end of the link 43 is disposed between the pivot pin 73 and the pivot pin 48. When, after release of the latch 56, fluid under pressure is introduced into the inner end of the cylinder 23 in connection with upward swing or retraction of the strut the cylinder moves slightly inwards, i. e., in an inboard direction, and operates, through the medium of the arms 30 and the linkage 68, to rotate the link 43 in a clockwise direction, as viewed in Figures 3 and 4, and thus "breaks" the dead-center relation of the links 43 and 44. When fluid under pressure is introduced into the outer end of the cylinder 23 in connection with lowering of the wheel carrying strut 10 the cylinder, as the strut approaches its fully down position, moves outwards, i. e., towards the arm 15 of the elbow 13 and such movement on the part of the cylinder operates, through the medium of the arms 30 and the arm 69 and link 70 constituting the second linkage 68, to rotate the link 43 of the locking linkage in a clockwise direction and thus bring the two links into dead-center or self locking position. The linkage 68, together with the sleeve 29 and the arms 30, exemplifies simple means for "breaking" the locking linkage after release of the latch 56 as a preliminary to retraction of the strut 10.

The operation of the gear is as follows: When it is desired to retract the strut the handle of the control valve for the hydraulic device 11 is swung or manipulated so as to cause fluid under pressure to enter the inner end of the cylinder 23 via the pipe 41. During initial movement of the valve handle the latch 56 is swung into its released position. When fluid under pressure first flows into the inner end of the cylinder and builds up pressure between the inner head 26 and the piston 24 the cylinder is shifted inwards to a limited extent, as previously described, and operates, through the medium of the interconnection type linkage 68, to "break" downwards the links 43 and 44. As soon as these two links are "broken," i. e., shifted downwards out of their dead-center or self locking position the piston 24 slides outwards and operates, through the medium of the piston rod 34 and the arm 37, to rotate or swing the strut into its retracted position. As soon as the link 44 starts to swing relatively to the link 43 in connection with upward swinging of the strut the arcuate or sector shaped portions 67 of the enlargements 50 swing into engagement with the rollers 63 and coact therewith to hold the latch in its retracted position. When it is desired to lower the strut the control valve for the hydraulic device 11 is manipulated so as to cause fluid under pressure to enter the outer end of the cylinder 23 and simultaneous venting of the inner end of the cylinder. As pressure builds up between the piston 24 and the outer head 27 of the cylinder the piston slides in the direction of the inner cylinder head 26 and causes the strut to swing downwards. As the strut approaches its fully down position the cylinder 23 of the hydraulic device moves slightly outwards in the direction of the arm 15 of the elbow 13 and operates, as hereinbefore described, to swing the links 43 and 44 into dead-center relation. As soon as the two links pivot into such relation the latch 56 snaps or swings into its locking position wherein it serves positively to hold the two links in their dead-center or self locking relation.

The herein described retractable landing gear is simple in design and construction and is characterized by the fact that the locking linkage 12 serves effectively and efficiently to lock the wheel carrying strut 10 in its operative or down position. It is further characterized by the fact that a single control movement of the handle of the valve for controlling the hydraulic device 11 results in release of the latch 56, "breaking" of the locking linkage, and up-swing of the strut into its retracted position. Due to the simplicity of the locking linkage and latch the actuating and control mechanism for the wheel carrying strut is light in weight and occupies but a small amount of space in the wing of the airplane with which the gear is associated.

The invention is not to be understood as restricted to the details set forth since these may be modified within the scope of the appended claims without departing from the spirit and scope of the invention.

Having thus described the invention what we claim as new and desire to secure by Letters Patent is:

1. A retractable landing gear for a wing equipped airplane, comprising a strut having at one end thereof a ground wheel and at its other end a laterally extending member provided with a rigid radially extending arm and journalled in the wing of the airplane so that the strut is permitted to swing back and forth between an operative position wherein it extends downwards from the wing and a retracted position wherein it is disposed in, and in substantially parallel relation with the wing, power means in the wing for swinging the strut back and forth between said positions, and a linkage for releasably locking the strut against pivotal movement about the axis of the journal for the member when the strut is in its operative position, disposed wholly within the wing regardless of whether the strut is in its operative or retracted position and embodying a pair of links having certain ends thereof pivotally connected together and their other ends pivoted one to a fixed part within the wing and the other to the distal end of the arm, and arranged to extend in dead-center relation when the strut is in its operative position and to break in one direction in connection with swinging of the strut into its retracted position.

2. A retractable landing gear for a wing equipped airplane, comprising a strut having at one end thereof a ground wheel and at its other end a laterally extending member provided with a pair of rigid radially extending arms and journalled in bearings in the wing so that the strut is permitted to swing back and forth between an operative position wherein it extends downwards from the wing and a retracted position wherein it is disposed in, and in substantially parallel relation with, the wing, a hydraulic device in the wing for swinging the strut back and forth between said positions consisting of a cylinder member and a piston member and having one of the members thereof operatively connected to the outer end of one of the arms, and a linkage in parallel relation with the hydraulic device for releasably locking the strut against pivotal movement about the axis of the journal for said member when the strut is in its operative position, disposed wholly within the wing regardless of whether said strut is in its operative or retracted position and embodying a pair of links having certain ends thereof pivoted together and the other ends pivoted respectively to a fixed part of the wing and the distal end of the other arm, and arranged to extend in dead-center relation when the strut is in its operative position and to break in one direction in connection with swinging of the strut into its retracted position by said hydraulic device.

3. A retractable landing gear for an airplane of the low wing variety, comprising a strut having at one end thereof a ground wheel and at its other end a laterally extending member provided with a rigid radially extending arm and journalled in the wing of the airplane so that the strut is permitted to swing back and forth between an operative position wherein it extends downwards from the wing and a retracted position wherein it is disposed in, and in substantially parallel relation with, the wing, power means in the wing for swinging the strut back and forth between said positions, a linkage for releasably locking the strut against pivotal movement about the axis of the journal for said member when the strut is in its operative position, disposed wholly within the wing regardless of whether said strut is in its operative or retracted position and embodying a pair of links having certain ends thereof pivotally connected together and their other ends pivoted one to a fixed part within the wing and the other to the distal end of the arm, and arranged to extend in dead-center relation when the strut is in its operative position and to break in one direction in connection with swinging of the strut into its retracted position, and a latch pivotally mounted on one of the links and arranged and adapted releasably to lock the links in their dead-center relation.

4. A retractable landing gear for a wing equipped airplane, comprising a strut having at one end thereof a ground engaging member and at its other end a laterally extending member provided with a pair of rigid outwardly extending arms and journalled in bearings in the wing of the airplane so that the strut is permitted to swing back and forth between an operative position wherein it extends downwards from the wing and a retracted position wherein it is disposed within, and substantially in parallel relation with, the wing, a hydraulic device in the wing for swinging the strut back and forth between said positions consisting of a cylinder member and a piston member and having one of the members thereof operatively connected to the outer end of one of the arms, a linkage in parallel relation with said hydraulic device for releasably locking the strut against pivotal movement about the axis of said bearings when it is in its operative position disposed wholly within the wing regardless of whether the strut is in its operative or retracted position and embodying a pair of links having certain ends thereof pivotally connected together and their other ends pivoted respectively to a fixed part of the wing and the distal or outer end of the other arm, and arranged to extend in dead-center relation when the strut is in its operative position and to break in one direction in connection with swinging of the strut into its retracted position, and an interconnection in the wing between the other member of the device and the linkage for automatically shifting the links in said one direction out of their dead-center relation when the device is initially actuated in connection with swinging of the strut into its retracted position.

5. A retractable landing gear for an airplane, comprising a strut having a ground engaging member at one end thereof and its other end pivotally connected to the airplane so that the strut is permitted to swing back and forth between operative and retracted positions, a hydraulic device for swinging the strut back and forth between said positions consisting of a cylinder member and a piston member in the cylinder member and having one of the members thereof operatively connected to the strut and the other member mounted to move to a limited extent, a linkage for releasably locking the strut in its operative position embodying a pair of links one of which has one end thereof pivoted to the strut and the other of which has one end thereof pivoted to the other end of the one link and its other end pivoted to a fixed part of the airplane and provided with a lug type extension, said links being arranged to extend in dead-center relation when the strut is in its operative position and to break in one direction in connection with swinging of the strut into its retracted position, and a second linkage between the other member of the hydraulic device and the linkage adapted automatically to shift the links of said first mentioned linkage in said one direction out of their dead-center relation when the device is initially actuated in connection with swinging of the strut into its retracted position and consisting of a rotatable element adjacent the other member of the device, an arm connected to, and extending radially from, the element and having its distal end pivotally connected to said other member of the device, a second arm connected to, and extending radially from, the element and projecting in opposite relation with respect to the first mentioned arm, and a link extending between and having its ends pivotally connected to the distal end of said second arm and the lug type extension.

6. A retractable landing gear for a wing equipped airplane, comprising a strut having at one end thereof a ground wheel and at its other end a laterally extending member provided with a pair of rigid outwardly extending arms and journalled in bearings in the wing so that the strut is permitted to swing back and forth between an operative position wherein it extends downwards from the wing and a retracted position wherein it is disposed within, and in substantially parallel relation with, the wing, a hydraulic device in the wing for swinging the strut back and forth between said positions consisting of a cylinder mounted to move to a limited extent and a piston slidably mounted in the cylinder and operatively connected to the outer end of one of the arms, a linkage for releasably locking the strut in its operative position disposed within the wing and embodying a pair of links one of which has one of its ends pivoted to the distal end of the other arm and the other of which has one end thereof pivoted to the other end of the one arm and its other end pivoted to a fixed part of the wing and provided with an outwardly extending lug type extension, said links being arranged to extend in dead-center relation when the strut is in its operative position and to break in one direction in connection with swinging of the strut into its retracted position by said hydraulic device, and a second linkage between the cylinder and the first mentioned linkage disposed within the wing, arranged so that it operates automatically to shift said links in said one direction out of dead-center relation when the hydraulic device is initially operated in connection with swinging of the strut into its retracted position, and consisting of a rotatable element adjacent the cylinder, an arm connected to, and extending radially from, the element and having its distal end pivotally connected to said cylinder, a second arm connected to, and extending radially from, said element and projecting in opposite relation with respect to the first mentioned arm of said second linkage and a link extending between, and having its ends pivotally connected to, said lug type extension and the distal end of said second arm.

RICHARD W. PALMER.
JOHN M. HUDSON.